United States Patent
Digon

(10) Patent No.: US 8,525,805 B2
(45) Date of Patent: Sep. 3, 2013

(54) SENSING DEVICE AND METHOD

(75) Inventor: Martin Charles Digon, Brighton (GB)

(73) Assignee: Koninklijke Philips N.V., Eindhoven (NL)

( * ) Notice: Subject to any disclaimer, the term of this patent is extended or adjusted under 35 U.S.C. 154(b) by 473 days.

(21) Appl. No.: 12/744,347

(22) PCT Filed: Nov. 21, 2008

(86) PCT No.: PCT/IB2008/054891
§ 371 (c)(1),
(2), (4) Date: May 24, 2010

(87) PCT Pub. No.: WO2009/069049
PCT Pub. Date: Jun. 4, 2009

(65) Prior Publication Data
US 2010/0231546 A1 Sep. 16, 2010

(30) Foreign Application Priority Data
Nov. 28, 2007 (EP) .................................. 07121753

(51) Int. Cl.
*G06F 3/041* (2006.01)
(52) U.S. Cl.
USPC ........................... 345/173; 345/174; 715/863
(58) Field of Classification Search
USPC ................. 345/173–179, 184, 684; 715/863
See application file for complete search history.

(56) References Cited

U.S. PATENT DOCUMENTS

| | | | |
|---|---|---|---|
| 3,346,510 A | 10/1967 | Sinfelt et al. | |
| 5,612,719 A | 3/1997 | Beernink et al. | |
| 6,707,449 B2 | 3/2004 | Hinckley et al. | |
| 2003/0174149 A1 | 9/2003 | Fujisaki et al. | |
| 2006/0026521 A1 | 2/2006 | Hotelling et al. | |
| 2006/0055662 A1 | 3/2006 | Rimas-Ribikauskas et al. | |
| 2006/0267951 A1 | 11/2006 | Rainisto | |
| 2007/0024595 A1 | 2/2007 | Baker et al. | |
| 2007/0222767 A1* | 9/2007 | Wang .............................. 345/173 |

FOREIGN PATENT DOCUMENTS

| | | |
|---|---|---|
| WO | 0208881 A2 | 1/2002 |
| WO | 2006009516 A1 | 1/2006 |
| WO | PCT/GB2012/050841 | 4/2012 |

OTHER PUBLICATIONS

Rubine, D.: "Specifying Gestures by Example"; Computer Graphics, vol. 25, No. 4, Jul. 1991, pp. 329-337.
Blasko et al: "A Menu Interface for Wearable Computing"; 6th IEEE International Symposium on Wearable Computers (ISWC 2002), Oct. 2002, pp. 164-165.
Epinions.com: "iRIVER H10 (5GB) MP3 Player"; Review of the iRIVER H10 MP3 Player by Epinions.com, Downloaded at http://www.epions.com/pr-iRiver_H10_5_GB_MP3_Player/display_~full_specs on May 30, 2007, 3 Page Document.

* cited by examiner

*Primary Examiner* — Kimnhung Nguyen

(57) ABSTRACT

A system is provided for controlling the scroll direction and speed of a User Interface list via a continuous back and forth motion along a single-axis input mechanism. A method, graphical user interface, computer program product and use is also provided.

11 Claims, 4 Drawing Sheets

SENSING DEVICE AND METHOD

FIELD OF THE INVENTION

This invention pertains in general to the field of user interfaces for navigating information. More particularly the invention relates to a method and a unit for touch scrolling.

BACKGROUND OF THE INVENTION

Portable electronic devices such as mobile telephones, personal digital assistants, audio players and multimedia players, often have a scrolling functionality for navigating information such as menus and content lists.

The way in which a user controls a portable electronic device via its User Interface (UI) is often the key for the device's success, both from the point of view of usability and aesthetic appeal.

The UI of most portable electronic devices consists of a Graphical UI (GUI), that displays information to the user, and a physical input mechanism, that allows the user to control the device. GUIs typically display large lists of contents or options as a list that the user can scroll. The challenge is to create an input mechanism that allows the user to scroll this information effectively, while fitting in a small physical space.

There are currently at least three types of input mechanisms that are used to scroll large content lists. These types are independent buttons, scroll wheels, and single axis control.

Independent buttons may e.g. be down and up buttons to scroll up and down in a list, respectively. Independent buttons may be physical, moving buttons or touch- or proximity-sensing areas of the device's exterior. However, a drawback with independent buttons is that it requires a lot of button presses in order to navigate large lists of information. Moreover, independent buttons does not allow for fine control such as scrolling speed.

Scroll wheels allow the user to control the scroll direction, such as clockwise or counter clockwise movement, and scroll speed, such as rotation speed. Scroll wheels may be physical, rotating wheels, or touch- or proximity-sensing circular areas. However, scroll wheels typically occupy a large area compared to the size of modern portable electronic devices.

Single-axis controls may e.g. be a touch- or proximity-sensing strip, wherein a user may control the scrolling by pressing or stroking different parts of the strip. However, commonly known single-axis controls typically require the user to repeatedly lift the finger and repeat the same movement over and over, in order to scroll long lists of information. Moreover, it is also difficult to control the speed of a scroll using commonly known single-axis controls.

Hence, an improved method, device, user interface, computer program product would be advantageous.

SUMMARY OF THE INVENTION

Accordingly, the present invention preferably seeks to mitigate, alleviate or eliminate one or more of the above-identified deficiencies in the art and disadvantages, singly or in any combination, and solves at least the above mentioned problems by providing a device and a method, according to the appended patent claims, for letting a user controlling the navigation of an information structure by means of continuous multidirectional movements.

In an aspect of the invention a method is provided. The method comprises the steps of:

sensing a first movement of an object in a first direction defined between a first point and second point,
calculating a first parameter based on said first movement,
sensing a second movement of said object in a second direction defined between said second point and a third point,
calculating a second parameter based on said second movement, and
controlling a first navigation function based on said first parameter and said second parameter.

Moreover, the method may comprise sensing a second movement of said object in a second direction defined between said second point and a third point, wherein said second direction having at least one component in a different direction compared to said first direction. Furthermore, the method may comprise calculating a second parameter based on said second movement, and controlling a first navigation function based on said first parameter and said second parameter.

According to another aspect of the invention a system is provided. The system comprises a touch-sensing unit configured to sense a first movement of an object in a first direction defined between a first point and second point. The touch-sensing unit may also be configured to sense a second movement of said object in a second direction defined between said second point and a third point, wherein said second direction having at least a component in the opposite direction of said first direction. The system may also comprise a control unit configured to calculate a first parameter based on the first movement of said first movement. Moreover, the control unit may be further configured to calculate a second parameter based on said second movement. Furthermore, the control unit may be further configured to control a first navigation function based on said first parameter and said second parameter.

In an aspect of the invention a computer-readable medium having embodied thereon a computer program for processing by a processor is provided. The computer program comprises a code segment for sensing a first movement in a first direction along a first axis defined between a first point and second point, a code segment for calculating a first parameter based on said first movement, a code segment for sensing a second movement in a second direction, such as along a second axis, defined between said second point and a third point, a code segment for calculating a second parameter based on said second movement, and a code segment for controlling a first navigation function based on said first parameter and said second parameter.

In an aspect of the invention a graphical user interface is provided, and configured to enable a user to define which movement or sequence of first and second movements that are related to the first navigation function according to claim 1.

The present invention according to some embodiments uniquely combines the natural, continuous-motion advantage of a scroll wheel and the small-space advantage of a single-axis control.

In some embodiments a system is provided allowing a user to scroll a list effectively, while fitting in a small physical space.

The present invention according to some embodiments provides a very brand-distinctive usability feature in a very large, growing area of the consumer electronics market that includes MP3 players, portable video players, mobile phones and PDAs.

BRIEF DESCRIPTION OF THE DRAWINGS

These and other aspects, features and advantages, of which the invention is capable of, will be apparent and elucidated from the following description of embodiments of the present invention, reference being made to the accompanying drawings, in which.

DESCRIPTION OF EMBODIMENTS

Figure 1:
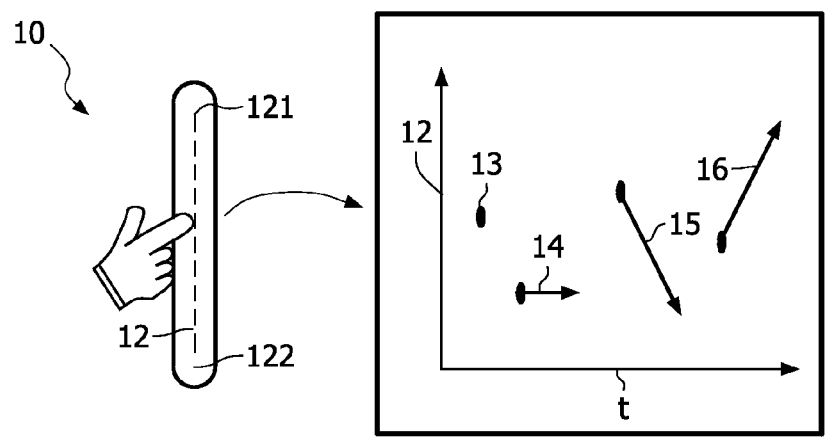
FIG. 1 represents the existing use of single-axis sensing devices for control of scroll functionality, by tapping, depressing or sliding a finger on the sensing surface.

FIG. 1 illustrates a common use of a touch-sensing unit 10 for controlling of scroll functionality. The touch-sensing unit 10 is configured to sense an object, such as a finger, touching the unit an axis 12, and/or a movement of the object along the axis 12 defined between a point 121 and a point 122. The touch-sensing unit may in dependence of the location of the sensed object generate an output signal comprising information, such as location coordinates, object pressure intensity applied on the touch unit, etc. regarding the sensed object. The motion may e.g. be made by a user's finger being pressed against a surface of the touch-sensing unit. FIG. 1 also illustrates a diagram showing the motion as a function of the position of interaction along the axis 12 and time t. Different commonly known ways of interacting with a known touch-sensing unit for controlling a scroll functionality are illustrated in the diagram wherein 13 represents the user touching or pressing (interacting with) a point on a sensing device. Depending on the position of the point of interaction, said interaction could trigger a forward or backward scroll at a set speed, and a further separate interaction could stop the scrolling. Moreover, 14 represents the user interacting statically with said device, for example pressing a finger against the sensing device and holding the finger still. Depending on the position of the point of interaction, the interaction could trigger a scroll in a certain direction, at a certain speed, for the duration of the static interaction. Furthermore, 15 represents the user stroking said sensing device downwards. The length and speed of the stroke could dictate the speed of a downward scroll. Moreover, 16 represents the user stroking said sensing device upwards. The length and speed of the stroke could dictate the speed of an upward scroll. These common basic uses may be combined, for example, by pressing and holding a finger over a point on the sensing device to scroll slowly, and finishing the interaction with a downward stroke to speed up the scroll.

Several embodiments of the present invention will be described in more detail below, with reference to the accompanying drawings, in order for those skilled in the art to be able to carry out the invention. The invention may, however, be embodied in many different forms and should not be construed as limited to the embodiments set forth herein. Rather, these embodiments are provided so that this disclosure will be thorough and complete, and will fully convey the scope of the invention to those skilled in the art. The embodiments do not limit the invention, but the invention is only limited by the appended patent claims. Furthermore, the terminology used in the detailed description of the particular embodiments illustrated in the accompanying drawings is not intended to be limiting of the invention.

Figure 2:
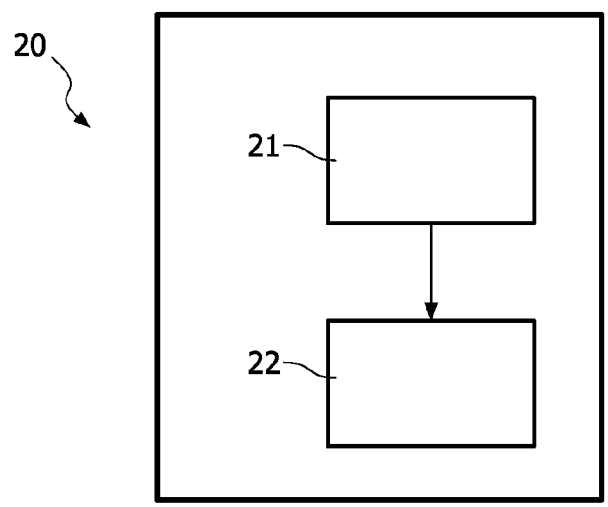
FIG. 2 is a block diagram showing a system according to an embodiment of the invention.

In an embodiment, according to FIG. 2, a system 20 is provided. The system comprises a touch-sensing unit 21 and a control unit 22 for controlling a scroll functionality e.g. scrolling or any other navigation function. The system 20 may be incorporated in a portable device comprising a display, and may be configured to enable enhanced user interaction to be performed using the touch-sensing unit 21. Several embodiments of the system 10, or one or more of its components, is described below with reference to movement pattern diagrams (MPDs) illustrating various ways of interacting with said touch sensing unit, all of which depend on how the system and its components are configured. Each MPD illustrates a motion sensed by a touch-sensing unit as a function of the position of interaction along a reference axis, and time.

Figure 3:
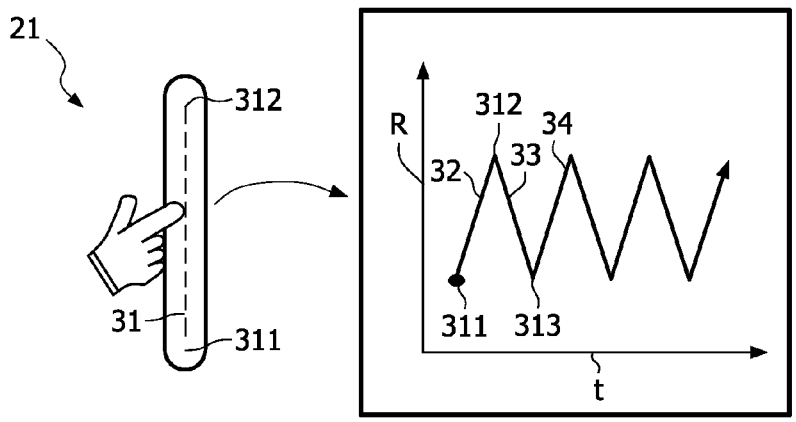
FIG. 3 is an illustration showing an embodiment based on constant frequency movement.

In an embodiment, according to FIG. 3, a movement made by a user's finger being pressed against a surface of the touch-sensing unit 21 and being moved along a first direction, such as along a first axis 31, defined between a first point 311 and a second point 312, may be detected by the touch-sensing unit 21. FIG. 3 illustrates the movement as a MPD relative to the first axis 31. According to this embodiment, the touch-sensing unit is configured to detect a first movement 32 substantially along the first axis. The control unit may be configured to calculate a first parameter based on the first movement 32. When the first movement is detected the control unit may initiate or trigger a first navigation function, such as a scroll function, based on the first parameter. Moreover, the touch-sensing unit may be configured to detect a second movement 33 in a second direction, such as along a second axis 31', defined between the second point 312 and a third point 313, which in this case is located near the first point 311, as is indicated in the MPD in FIG. 3. The y-axis of the MPD in FIG. 3 is proportional to a reference axis R along which each movement is detected. Accordingly, the reference axis is the first axis for the first movement, and the second axis for the second movement, etc.

In an embodiment the second axis is substantially the same as the first axis.

In an embodiment the second axis is identical to the first axis.

In an embodiment the object is in contact with the touch-sensing unit from the start of the first to the end of the second movement.

Furthermore, the control unit may be configured to calculate a second parameter based on the second movement. The second parameter may e.g. represent a state of dynamic user interaction, such as, a user applying a stroking motion to the touch-sensing unit along the second axis. In order for the control unit to initiate calculating the second parameter, there has to be contact between the object and the touch-sensing unit before the second movement, such as when a continuous stroke starts as a first movement and continues into a second movement.

Should there be no applied pressure or touching by an object on the touch-sensing unit throughout the first and second movement, the second movement may in fact be defined as a first movement, and the control unit accordingly may calculate a first parameter.

In an embodiment in order for a second parameter to be calculated by the control unit, the object has to be in communication with the touch-sensing unit from the start of the first movement until the end of the second movement.

The control unit may also be configured to initiate or trigger a second navigation function, such as a continuing scroll function, based on the first function and the second parameter.

The calculated first or second parameter may depend on variables e.g. comprising information regarding the speed of the first or second movement, direction of the first or second movement, the distance of the first or second movement, or acceleration during the first or second movement.

In some embodiments the first parameter may define the scroll speed of the first navigation function, and direction of scroll of the first navigation function.

In some embodiments the first and second parameter defines the speed, and direction of scroll of the second navigation function.

In an embodiment the second navigation function is a continuance of the first scroll function. For example, if the first navigation function pertains to downward scrolling, the second navigation function also pertains to downward scrolling. However, depending on the speed or acceleration of the second movement the second navigation function may differ from the first navigation function.

In an embodiment, the first parameter is identical to the second parameter when e.g. the speed of the first movement is identical to the speed of the second movement.

In an embodiment, the second movement has at least one component detected having a direction opposite the direction of the first movement. For example, the second movement may be opposed to the first movement. This embodiment enables a user to continue a navigation function in one direction, by starting with a first movement and subsequently repeatedly performing second movement, third movement, and so on, e.g. back and forth, along the axis of the touch-sensing unit.

Constant Frequency Movement

FIG. 3 is an illustration showing an embodiment of the present invention, in which a user initiates a first movement followed by a repeated number of second movements. Accordingly, the user performs one continuous interaction by, for example, placing a finger on the sensing device and moving it repeatedly back and forth. The touch-sensing unit 21 detects the movements. Although the finger is being moved both up and down, the first navigation function and the second navigation function defines a scroll in the same direction, e.g. upwards. As may be observed from FIG. 3 the speed of the first movement and speed of the repeated number of second movements is identical. More particularly, the distance of the first movement is identical to the distance of any of the repeated number of second movements. Accordingly, as the variables influencing the first and second parameter are identical throughout the first movement and the repeated second movements, the first and second navigation function will be identical. As may be observed from FIG. 3 the first movement may be defined as an upward movement. Accordingly, the first navigation function may define an upward scroll. The second navigation function will thus also be an upward scroll as the first movement defined an upward scroll. The upward scroll may continue for as long as the user continues interacting with the touch-sensing unit.

It should be appreciated that a detected direction of movement, at the time when the interaction stops, is irrelevant for the scroll direction, as only the first movement, according to some embodiments, determines the scroll direction.

As may be observed from FIG. 3, several movements 32, 33, 34 are performed by the user. In some embodiments, for each additional movement, the touch-sensing unit is configured to detect an additional movement between the end point of the previous movement, e.g. the third point 313 of the second movement, and a new point along a reference axis. Moreover, the control unit is configured to calculate an additional parameter, and an additional navigation function based on the previous function and the additional parameter. Accordingly, for each additional movement, the control unit may control a new navigation function based on one or more previous navigation functions, and may also control a new additional parameter.

Figure 4:
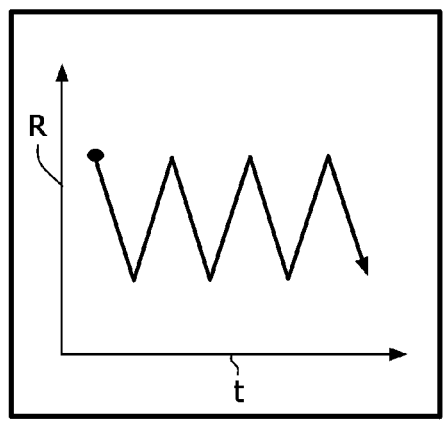
FIG. 4 is an illustration showing an embodiment based on constant frequency movement.

FIG. 4 is an illustration showing an embodiment of the present invention, wherein the first movement is a downward movement. FIG. 4 corresponds to FIG. 3 except for the fact that the first movement is downwards, instead of upwards. Accordingly, the resulting navigation function may be defined as a downward scroll.

Variable Distance Movement

Figure 5:
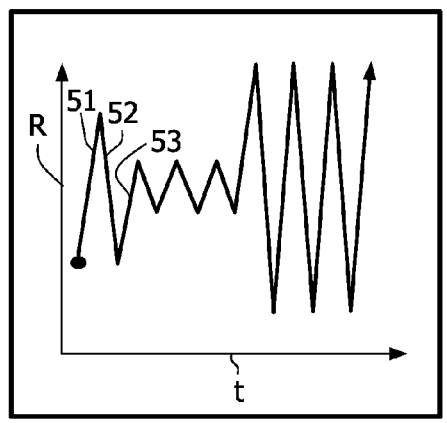
FIG. 5 is an illustration showing an embodiment based on variable distance (amplitude) movement.

As is mentioned above a variable having impact on the parameter related to a movement may be the distance of said movement. In some embodiments, by varying the movement distance the resulting navigation function may be varied. FIG. 5 is an illustration showing a MPD according to an embodiment of the invention, in which a user interacts with the touch-sensing unit through movements of varying distance. By varying the distance of the movements, the user could for example increase or decrease the scroll speed accordingly, or trigger any other function related to navigating an information structure. For example, in FIG. 5, the distance of the first 51 and of the second 52 movement is larger than the distance of the third movement 53. The fourth movement is smaller than the third distance movement. For example, the distance of said first 51 and second 52 movement, which distances being comprised in the first and second parameter, respectively, may be used by the control unit to control an upward navigation function having a certain speed. From the third movement the distance is decreased. Based on the decrease in movement distance, the control unit may initiate or trigger a navigation function e.g. having a slower scroll speed than the second navigation function. Furthermore, when the movement distance is increased again, the scroll speed of the resulting navigation function may be increased again. As may also be observed from FIG. 5, the movement frequency is constant. Accordingly, this embodiment enables the user to control the scroll speed of a navigation function based on the distance of each movement. Moreover, the scroll speed of the navigation function may be dependent on the movement distance of each movement.

Variable Frequency Movement

Figure 6:
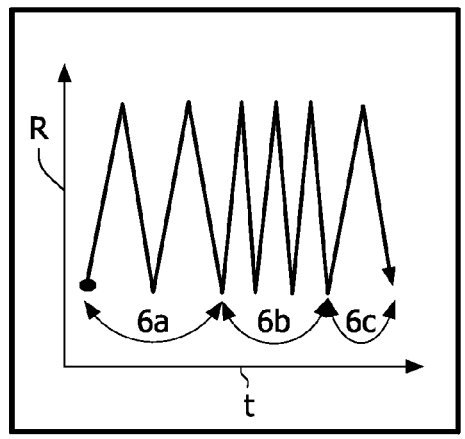
FIG. 6 is an illustration showing an embodiment based on variable frequency movement.
Figure 7:
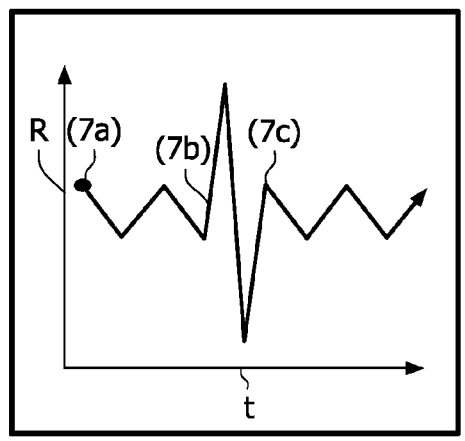
FIG. 7 is an illustration showing an embodiment based on variable distance movement and variable frequency movement.

As mentioned above, a variable having impact on the parameter related to a movement may be the frequency of said movements. In some embodiments, by varying the movement frequency, the scroll speed of the resulting navigation function may be varied. FIG. 6 is an illustration showing an embodiment, in which a user interacts with the touch-sensing unit through movements of varying distance and varying frequency. By varying the frequency of movement, a user could for example increase or decrease the scroll speed of the resulting navigation function. In FIG. 6 the user begins with slow back and forth motion (6a), which could initiate a navigation function having a certain upward scroll speed. When the user increases the movement frequency (6b), the scroll speed of the resulting navigation function may be increased, e.g. based on the increased movement frequency only and irrespective of movement distance. When the user decreases the movement frequency (6c), e.g. irrespective of movement distance, the scroll speed of the resulting navigation function may be decreased again.

Variable Distance and Frequency Movement

In some embodiments more than one variable may be used to define the scroll speed of the navigation function. FIG. 67 is an illustration in which a user interacts with the touch-sensing device through simultaneous variation of both the movement frequency and movement distance. By varying the movement frequency and movement distance, the user may for example increase or decrease the scroll speed of a navigation function.

Variable Distance Movement and Static Interaction

The navigation function according to some embodiments is not limited to scroll direction and scroll speed only, but may comprise other functionalities related to navigating an information structure.

Figure 8:
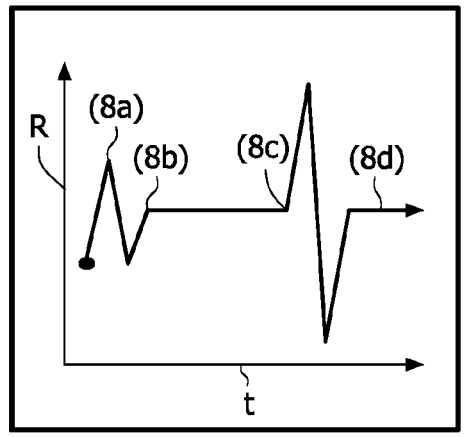
FIG. 8 is an illustration showing an embodiment based on variable distance movement and static interaction.

In FIG. 8, a user begins interacting by performing slow first and second movements (8a). The slow movements may result in a slow scroll speed of the resulting navigation function having a downward direction. In a practical implementation this could be scrolling down the items beginning with the letter "S" in a long list with the slow speed. By continuously pressing the touch-sensing unit without performing any movements (8b), i.e. static interaction, the resulting navigation function, according to some embodiments may be identical to the previous navigation function as long as the static interaction is sustained. Accordingly the downward scroll may continue.

When the user makes a single larger and faster movement (8c), this information could be used in the resulting navigation function to skip the current section of the list, e.g. causing the list jump to the items beginning with the letter "T" instead. The user may then continue to scroll down the items, by returning to the original movement speed and distance, and by continuously pressing the touch-sensing device without movement. Another single large movement could e.g. result in a navigation function to skip to the next letter of the list, e.g. "U".

Acceleration of Movement Speed

It should be understood that movement frequency is closely correlated to movement distance and movement speed. Instead of determining movement frequency, movement speed may be determined, e.g. by the control unit, and used for controlling navigation functions. In some embodiments the acceleration of the speed of a movement may be used as a variable for calculating parameters used to define the resulting navigation function. In this way a resulting MPD will comprise non-linear movement patterns.

Navigation Function

The navigation function may e.g. pertain to functions relating to navigation between letters, numbers, genres or shortcuts or jump to a position in a list, or triggering a function, corresponding to a chosen letter, number or shortcut. The navigation function may thus comprise a shortcut or link to another function that the user is interested in to perform. Accordingly, by performing a predefined sequence of movements the user may reach the functions linked to the predefined sequence of movements.

The control unit according to some embodiments is not limited to the function mentioned in the embodiments above, but is able to initiate any navigation function based on certain predefined movements or movement sequences made by a user on the touch-sensing unit.

Movement and Movement Sequence

In another embodiment, the second direction of movement has at least one component in different direction compared to the first direction. This could be an advantageous feature for 2D touch sensing units. Accordingly, the user may control desired functions by moving an object, such as a finger, on the touch-sensing unit in a first movement in a first direction, followed by one or more consecutive movements in one or more directions on said 2D touch-sensing unit.

Figure 9:
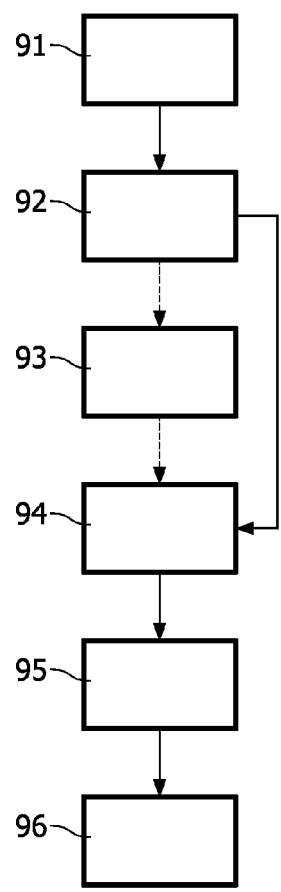
FIG. 9 is a flow chart showing a method according to an embodiment.
Figure 10:
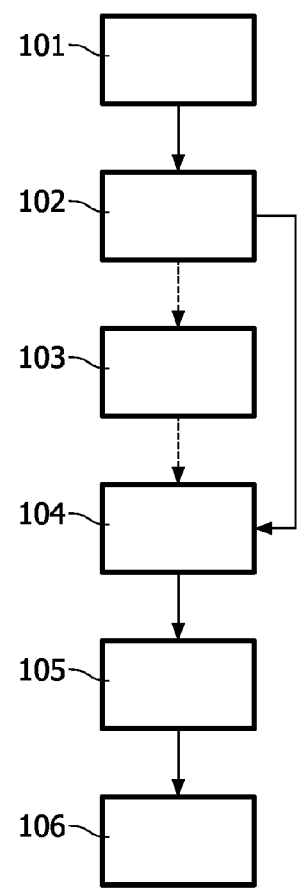
FIG. 10 is a flow chart showing a computer program according to an embodiment.

In an embodiment, according to FIG. 9, a method is provided. The method comprises sensing 91 a first movement 32 in a first direction, such as along a first axis 31, defined between a first point 311 and second point 312. The method may also comprise calculating 92 a first parameter based on the first movement 32. Furthermore, the method may comprise controlling 93 a first navigation function based on the first parameter. Moreover, the method may comprise sensing 94 a second movement 33 in a second direction, such as along a second axis, defined between the second point 312 and a third point 313. Moreover, the method may comprise calculating 95 a second parameter based on the second movement 33. Furthermore, the method may comprise controlling 96 a second navigation function based on said first parameter or first navigation function and said second parameter.

In an embodiment a computer-readable medium having embodied thereon a computer program for processing by a computer is provided. The computer program comprises a code segment for sensing 101 a first movement 32 in a first direction, such as along a first axis 31, defined between a first point 311 and second point 312. The computer program may also comprise a code segment for calculating 102 a first parameter based on said first movement 32. Furthermore, the computer program may comprise a code segment for controlling 103 a first navigation function based on said first parameter. Moreover, the computer program may comprise a code segment for sensing 104 a second movement 33 in a second direction, such as along a second axis, defined between said second point 312 and a third point 313. Moreover, the computer program may comprise a code segment for calculating 105 a second parameter based on said second movement 33. Furthermore, the computer program may comprise a code segment for controlling 106 a second navigation function based on said first parameter or first navigation function and said second parameter.

The control unit may be any unit normally used for performing the involved tasks, e.g. a hardware, such as a processor with a memory.

Graphical User Interface

In an embodiment a graphical user interface is provided, in which a user may define which navigation functions are related to which movements or sequence of movements.

In some embodiments a graphical user interface is provided which is user-friendly, and which enables a user to have full control over scroll speed.

Moreover, the graphical user interface according to some embodiments makes it possible to dynamically add and remove functionality.

It should be appreciated by a person skilled in the art, that the method of interpreting one or more movements sensed by a sensing device may be implemented as either of, or as a combination of, hardware logic and software logic, and thus, that one or more logic functions required by the method may be integrated into the touch sensing unit.

Applications and use of the above-described embodiments according to the invention are various and the present invention according to some embodiments may be applied to any electronics product that requires user input. In particular it is useful for portable electronics equipment that require navigation of large data lists with a great deal of control, while minimising the space requirements of the input mechanism.

Although the present invention has been described above with reference to specific embodiments, it is not intended to be limited to the specific form set forth herein. Rather, the invention is limited only by the accompanying claims, and, other embodiments than the above-described embodiments are equally possible within the scope of the appended claims.

In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc. do not preclude a plurality. Reference signs in the claims are provided merely as a clarifying example and shall not be construed as limiting the scope of the claims in any way.

The invention claimed is:

1. A method comprising acts of:
    sensing a first movement of an object over a touch sensing unit between first and second points and a second movement of said object over the touch sensing unit between said second point and a third point, said second movement is in a second direction different from a first direction of the first movement;
    calculating first and second parameters based respectively on said first and second movements; and
    controlling a first navigation function based on at least one of said first parameter and said second parameter.

2. The method according to claim 1, further comprising an act of controlling a second navigation function based on one of said first parameter and said second parameter.

3. The method according to claim 1, wherein said object is in contact with the touch-sensing unit from a start of the first movement to an end of the second movement.

4. The method according to claim 1, wherein at least one of said first and second parameters comprises at least one of a speed of the first movement, the first direction, a distance span of said first movement, and an acceleration during said first movement.

5. The method according to claim 1, wherein said second direction includes at least one component in an opposite direction of said first direction.

6. The method according to claim 1, wherein one of the first and second navigation functions is a scroll function.

7. The method according to claim 6, wherein a scroll direction of the scroll function is the same as the scroll direction of the other of the first and second navigation functions.

8. A system comprising:
    a touch sensing unit configured to
        sense a first movement of an object over the touch sensing unit between first and second points, and
        sense a second movement of said object over the touch sensing unit between said second point and a third point, said second movement is in a second direction different from a first direction of the first movement,
    a control unit configured to
        calculate first and second parameters based respectively on the first and second movements, and
        control a first navigation function based on at least one of said first and second parameters.

9. The system according to claim 8, wherein said control unit is further configured to control a second navigation function based on one of said first parameter and said second parameter.

10. A non-transitory computer readable media executable by a programmable device, to implement a method comprising acts of:
    sensing a first movement of an object over a touch sensing unit between first and second points and a second movement of said object over the touch sensing unit between said second point and a third point, said second movement is in a second direction different from a first direction of the first movement;
    calculating first and second parameters based respectively on said first and second movements; and
    controlling a first navigation function based on at least one of said first and second parameters.

11. A graphical user interface configured to:
    sense a first movement of an object over a touch sensing unit between first and second points and a second movement of said object over the touch sensing unit between said second point and a third point, said second movement is in a second direction different from a first direction of the first movement;
    calculate first and second parameters based respectively on said first and second movements; and
    control a first navigation function based on at least one of said first parameter and said second parameter.

* * * * *